(12) United States Patent
Bekelman

(10) Patent No.: US 7,877,731 B2
(45) Date of Patent: Jan. 25, 2011

(54) FORMATTING AND VIEWING SOURCE OBJECTS

(75) Inventor: Igor A. Bekelman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 11/674,109

(22) Filed: Feb. 12, 2007

(65) Prior Publication Data
US 2008/0196015 A1 Aug. 14, 2008

(51) Int. Cl.
G06F 9/44 (2006.01)
(52) U.S. Cl. ............... 717/123; 717/105; 717/109; 717/111; 717/113; 717/121; 717/122
(58) Field of Classification Search .......... 717/100, 717/104–113, 120–123; 703/22–28; 700/29–31

See application file for complete search history.

(56) References Cited

U.S. PATENT DOCUMENTS

| 4,447,888 A | 5/1984 | Kuecker et al. |
| 4,862,410 A | 8/1989 | Fukunaga |
| 5,212,771 A | 5/1993 | Gane |
| 5,307,493 A | 4/1994 | Gusenius |

(Continued)

OTHER PUBLICATIONS

Maruyama et al., "A CASE Tool Platform Using an XML Representation of Java Source Code"; Source Code Analysis and Manipulation, Fourth IEEE International Workshop on (SCAM'04); Sep. 16, 2004; 10 pg.*

(Continued)

Primary Examiner—Wei Y Zhen
Assistant Examiner—Ryan D Coyer
(74) Attorney, Agent, or Firm—Workman Nydegger

(57) ABSTRACT

A system, method, and computer readable storage medium for formatting and viewing a source object that allows software developers to select their own preferences for formatting and/or viewing the same source object.

8 Claims, 6 Drawing Sheets

U.S. PATENT DOCUMENTS

| | | | |
|---|---|---|---|
| 5,513,305 A | | 4/1996 | Maghbouleh |
| 5,596,704 A | | 1/1997 | Geddes |
| 5,754,859 A | * | 5/1998 | Long .................. 717/112 |
| 5,940,615 A | | 8/1999 | Novick et al. |
| 6,098,072 A | | 8/2000 | Sluiman et al. |
| 6,269,475 B1 | * | 7/2001 | Farrell et al. .......... 717/113 |
| 6,405,216 B1 | | 6/2002 | Minnaert |
| 6,558,431 B1 | * | 5/2003 | Lynch et al. .......... 715/210 |
| 6,851,107 B1 | | 2/2005 | Coad et al. |
| 6,986,103 B1 | | 1/2006 | Beezer |
| 7,110,936 B2 | * | 9/2006 | Hiew et al. .............. 703/22 |
| 7,240,296 B1 | | 7/2007 | Matthews |
| 7,272,815 B1 | * | 9/2007 | Eldridge et al. ........ 717/101 |
| 7,370,315 B1 | * | 5/2008 | Lovell et al. .......... 717/100 |
| 7,596,611 B1 | | 9/2009 | Satish |
| 7,712,042 B2 | | 5/2010 | Hernandez-Sherrington |
| 7,743,330 B1 | | 6/2010 | Hendricks |
| 2002/0099584 A1 | | 7/2002 | Findley |
| 2002/0109717 A1 | | 8/2002 | Li |
| 2002/0158864 A1 | | 10/2002 | Matichuk |
| 2003/0043200 A1 | | 3/2003 | Faieta |
| 2004/0027388 A1 | | 2/2004 | Berg |
| 2004/0122791 A1 | | 6/2004 | Sea et al. |
| 2005/0187930 A1 | | 8/2005 | Subramanian et al. |
| 2005/0210412 A1 | | 9/2005 | Matthews |
| 2005/0210445 A1 | * | 9/2005 | Gough et al. .......... 717/111 |
| 2006/0015817 A1 | | 1/2006 | Fioretti |
| 2006/0112123 A1 | | 5/2006 | Clark |
| 2006/0168182 A1 | * | 7/2006 | Fuller et al. ............ 709/223 |
| 2006/0200476 A1 | | 9/2006 | Gottumukkala |
| 2006/0224997 A1 | | 10/2006 | Wong et al. |
| 2006/0294474 A1 | | 12/2006 | Taylor |
| 2007/0061758 A1 | | 3/2007 | Manson |
| 2007/0106974 A1 | | 5/2007 | Chafe |
| 2007/0130193 A1 | | 6/2007 | McNally |
| 2007/0136333 A1 | | 6/2007 | Hassan |
| 2007/0214173 A1 | | 9/2007 | Ohashi |
| 2007/0299823 A1 | | 12/2007 | Getsch |
| 2009/0284549 A1 | | 11/2009 | Flynn |
| 2009/0287724 A1 | | 11/2009 | Murray |

OTHER PUBLICATIONS

Stallman, Richard, "EMACS The Extensible, Customizable Self-Documenting Display Editor"; ACM, 1981, 10pg.*

T. Dean Hendrix et al. "Language Indepdendent Generation of Graphical Representations of Source Code", Proceedings of the 1995 ACM 23rd annual conference on Computer science, 1995, pp. 66-72.

Martin Klang "XML and the Art of Code Maintenance", Extreme Markup Languages 2003: Proceedings, 2003.

Dong Hyuk Park et al. "XML rule based source code generator for UML CASE tool", Software Engineering Conference, 2001. APSEC 2001. Eighth Asia-Pacific, 2001, pp. 53-60.

Jonathat I. Maletic et al. "Source Code Files as Structured Documents", Proceedings of the 10th International Workshop on Program Comprehensions (IWPC'02).

Getting to Know Simile the Visual Modeling environment for ecological, Biological and Environmental Research http://www.simulistics.com/documents/Simile.pdf (42 pages).

Process Component Models: The Next Generation in Windowflow http://www.infoq.com/articles/process-component-models (17 pages).

R. Ian Bull and Jean-Marie Favre "Visualization in the Context of Model Driven Engineering" http://webhome.cs.uvic.ca/~chisel/pubs/irbull_mddaui.pdf.

Margaret-Anne Storey, Casey Best, Jeff Michaud, Derek Rayside, Marin Litoiu, Mark Musen "SHriMP Views: An Interactive Environment for Information Visualization and Navigation" http://sigchi.org/chi2003/docs/shrimp.pdf 2003.

Flavius Frasincar, Alexandru Telea and Geert-Jan Houben "Adapting Graph Visualization Techniques for the Visualization of RDF Data" http://wwwis.win.tue.nl/~houben/respub/vsw2005.pdf 2005.

U.S. Appl. No. 12/121,485, filed Sep. 17, 2010, Office Action.

* cited by examiner

FORMATTING AND VIEWING SOURCE OBJECTS

BACKGROUND

Technologies for creating, maintaining, and executing source objects are abundant. For example, such technologies range from integrated development environments that allow software developers to write source objects in different programming languages to graphical representations of how the source objects executes. These tools address various challenges software developers face in developing software. But there is an increasing need to provide new tools that take into consideration that software developers may work together from across the globe, each speaking a different natural language and each with his own preferences for formatting and/or viewing source objects. Today's tools are inadequate in addressing such needs. As a result, new tools are required that address the challenges software developers face as a result of working in different locations, in different time zones, using different programming languages or speaking different natural languages while working together on the same programming project.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Systems and methods for formatting and/or viewing a source object are disclosed that provide software developers with a way to view and/or modify the source object according to a software developer's preferences without affecting the integrity of the source object or adversely affecting other software developers working on the same source object or a related source object. One or more rules are applied to a source object so that a software developer can view the source object according to particular preferences of the software developer. Software developer preferences may include but are not limited to font attributes, spacing attributes, natural language selection, viewing applications, editing applications, and the like. Software developer preferences may include a variety of features related to viewing, editing, storing, and/or interacting with the source object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Overview

Figure 1:
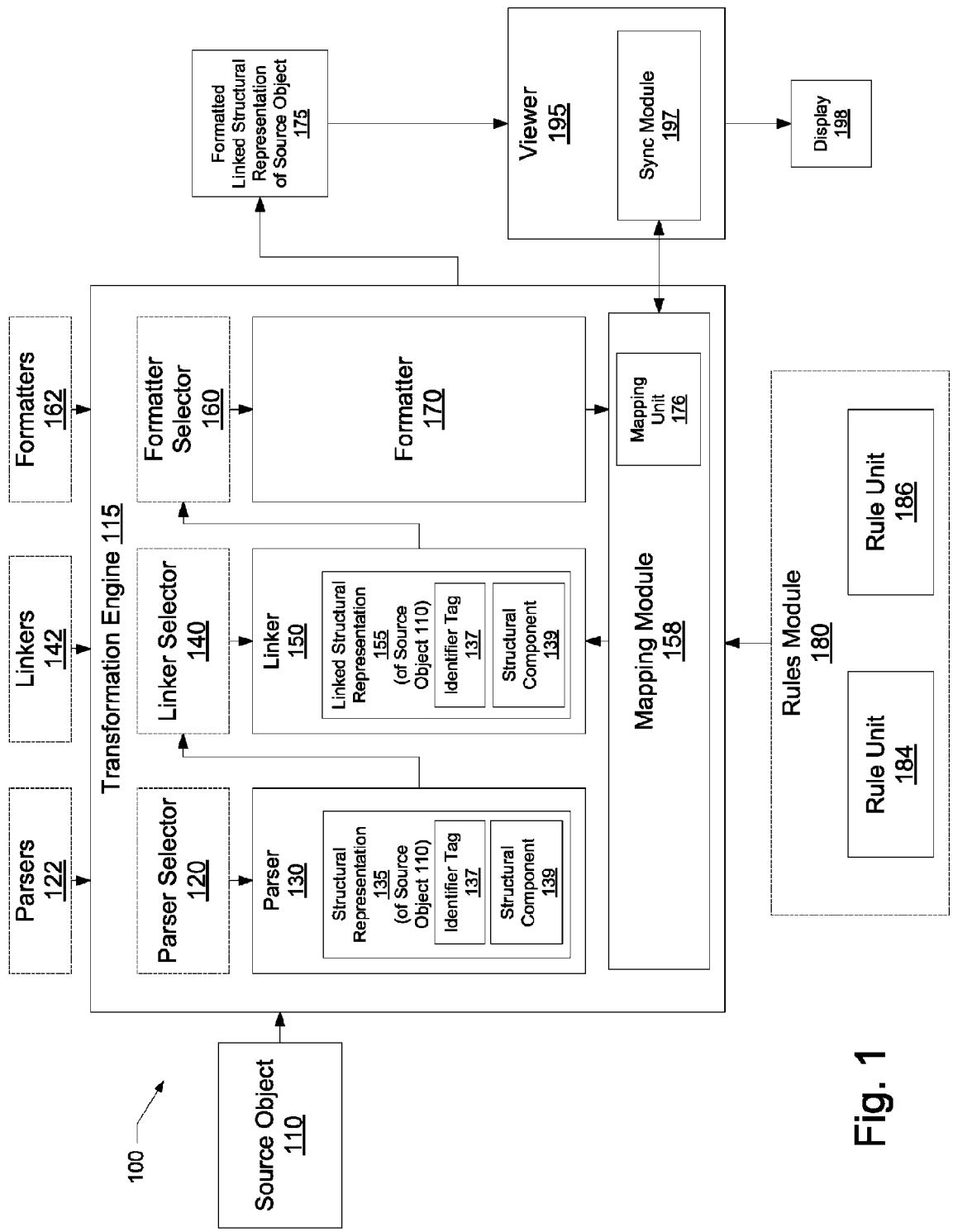
FIG. 1 is a diagram of an exemplary system for formatting and viewing a source object.

The detailed description provided below describes techniques for formatting and viewing a source object that allows an original source object to be replaced by a structural representation of the source object, such as an XML representation of the source object. A transformation engine receives the original source object, receives one or more rule from a rules module and processes the source object to create the structural representation of the source object. The structural representation of the source object includes one or more structural components. The original source object may be discarded after the structural representation is created. When the original source object is required, the original source object can be re-created from the stored structural representation of the source object.

The structural representation of the source object also contains one or more identifier tags for each structural component. The identifier tags enable a new way of interacting with the source object. For example, typically, when a software developer is editing a source object, the software developer must check out the entire source object from a repository that maintains the source object. As used herein, the term "software developer" may include anyone who designs, edits, views, tests or has any need or want to examine the source object. When one software developer modifies a software object, other software developers are unaware of what aspects of the source object are being modified. According to one or more implementations described herein, identifier tags allow a software developer to check out a particular structural component of the source object. This allows other software developers to know, in real-time, what components of the source object are checked out and allows the other software developers to modify other structural components of the same source object. Because the software developers are aware of the structural components being modified (in real-time), the software developers may communicate with each other (for example, via an instant messenger application) while they modify the same source object. Real time knowledge of each structural component of the source object being modified provides a new basis for integrated development of software as a web service.

The transformation engine also allows a software developer to format and view the source object according to personal preferences of the software developer. For example, a software developer may prefer to format one or more if-then statements such that the word if and the word then are in red text. The software developer's preferences are codified as rules and are stored in one or more rule units.

The transformation engine also enables viewing the source object in one or more viewers, without regard to the content of the rule units. For example, the source object may be in a particular file format, such as a .txt format. If the preferred viewer is a web browser, the transformation engine may process the source object by modifying the source object with hypertext markup language (HTML) code so that the source object can be viewed in the web browser. This may be done even if one or more rule units that are applied do not indicate that transformation to HTML should be performed.

The detailed description provided below in connection with the appended drawings is intended as a description of the present examples but is not intended to represent the only forms in which the presently described subject matter may be implemented. The description sets forth the functions of the example and a sequence of steps for implementing the examples presented herein. However, the same or equivalent functions and sequences may be accomplished by different implementations of the described subject matter.

The examples below describe an exemplary system for formatting and viewing a source object. Although the present examples are described and illustrated herein as being implemented using source code (e.g. SQL) as a source object and a browser as a viewer, the system described is provided as but one example of many systems that may be implemented using the techniques disclosed herein.

FIG. 1 is a diagram of an exemplary system 100 for formatting and/or viewing a source object 110. The system 100 includes a transformation engine 115 which has a parser 130, a linker 150, a formatter 170 and a rules module 180. The rules module 180 is shown having a first rule unit 184 and a second rule unit 186, although it is noted that the rules module 180 may contain from one to several rule units. Each rule unit 184, 186 includes one or more rules (not shown) that control formatting of one or more aspects of a source object.

The source object 110 is received by the transformation engine 115, which processes the source object 110 to format the source object 110. The transformation engine 115 parses, links, formats and applies a rule unit 184 included in the rules module 180 to the source object 110 to create a formatted linked structural representation 175 of the source object 110. A viewer 195 is configured to input the formatted linked structural representation 175 of the source object 110 and render a view of the formatted linked structural representation 175 of the source object 110 on a display 198. The display 198 is any device capable of rendering the formatted source object 190 in human readable form, such as a monitor, a printer or the like.

It is noted that while the source object 110 is shown and described herein as source code, the source object 110 is not limited to source code. The source object 110 may alternatively be precompiled code, data stored in a particular file format (for example in a .txt or .xls file format), a table of data used by a database, or the like. The source object 110 may also contain metadata that describes certain aspects of the source object 110. In one or more implementations, the transformation engine 115 can use such metadata to create a structural representation of the source object 110. Such representations are known in the art and are not discussed in further detail herein.

Although the parser 130, the linker 150, and the formatter 170 are shown as separate components, it is noted that in one or more other implementations, any combination of the parser 130, linker 150 or formatter 170 may be included into a single component. It is also noted that the transformation engine 115 may include one or up to all of these components. It is not necessary for the transformation engine 115 to include the parser 130, the linker 150, and the formatter 170. For example, in an alternate implementation, the transformation engine 115 could be configured to receive a parsed source object and process it by linking it and/or formatting it. In yet another implementation, the transformation engine 115 could be configured to receive a linked parsed source object and process it by formatting it.

The transformation engine 115 is shown with an optional parser selector 120 that is configured to receive the source object 110 and determine an appropriate parser from a plurality of parsers 122 to parse the source object 110. In at least one implementation, the parser selector 120 is configured to support different types of source objects by performing a lookup of a parser according to a source object type.

Although the transformation engine 115 is shown as including a parser selector 120, it is noted that the transformation engine 115 may be configured without the parser selector 120. In such a configuration, the transformation engine 115 may be configured to format and/or view a single type of source object and would not require the parser selector 120. Instead, the parser 130 would receive the source object 110 directly and parse the source object 110 because the corresponding parser would be known.

The parser 130 is configured to receive the source object 110 and to parse the source object 110 to create a structural representation 135 of the source object 110. The structural representation 135 of the source object 110 is composed of one or more structural components 139, including but not limited to a routine, a subroutine, a function, a variable, or the like, in the source object 110. In the examples that follow, a Backus-Naur Form parser is used to generate the structural representation 135 of the source object 110. Although a Backus-Naur Form parser is utilized in the following description, it is noted that any type of parser known in the art may be used to parse the source object 110 to create a structural representation 135 thereof.

The parser 130 also adds one or more identifier tags 137 to the structural representation 135 of the source object 110 for each structural component 139 in the structural representation 135 of the source object 110. In at least one implementation, an identifier tag 137 is a combination of alphanumeric characters that is unique to the structural component 139 associated with the identifier tag 137. As described in greater detail below, the identifier tag 137 for each structural component 139 is utilized by the formatter 170, a sync module 197, and a mapping module 158.

The structural representation 135 of the source object 110 may be created in a markup language. In the examples that follow, the structural representation 135 of the source object 110 is created in extensible markup language (XML) but is not limited to XML and may be created in any language or form as to be received, processed, and/or saved to a computer readable storage medium.

Furthermore, the structural representation 135 of the source object 110 may replace the original source object 110 as a primary means of storing the source object 110. For example, the source object 110 may be written in a particular programming language. The structural representation 135 of the source object 110 may be written in a markup language that contains all the information about the structure of the source object 110 and may also include comments. Once the structural representation 135 of the source object 110 is created and it has been linked by the linker 150, if appropriate, the source object 110 is no longer required. In the present implementation, the source object 110 may be discarded after the structural representation 135 of the source object 110 has been created from the source object 110. The source object 110 can be recreated from the structural representation 135 of the source object 110 if and when the source object 110, in its original programming language, is desired. When execution of the source object 110 is desired, the transformation engine 115 recreates the source object 110 by re-formatting the structural representation 135 of the source object 110 to create the source object 110 in its original programming language. But in addition to providing the capability to create an original version of the source object 110, the presence of the structural representation 135 of the source object 110 allows different versions of the source object 110 to be created as well.

The transformation engine 115 is shown with an optional linker selector 140 that is configured to receive and determine an appropriate linker 150 from a plurality of linkers 142 to link the structural representation 135 of the source object 110. In at least one implementation, the linker selector 140 is configured to support different types of source objects by performing a lookup according to a source object type.

Although the transformation engine 115 is shown as including a linker selector 140, it is noted that the transformation engine 115 may be configured without the linker selector 140. In such a configuration, the transformation engine 115 may be configured to format a single type of source object and would not require the linker selector 140. Instead, the linker 150 would receive the structural representation 135 of the source object 110 directly and link the structural representation 135 of the source object 110 because the corresponding linker would be known.

The linker 150 receives the structural representation 135 of the source object 110, links the structural representation 135 of the source object 110, and creates a linked structural representation 155 of the source object 110. Linking the structural representation 135 of the source object 110 may include resolving a reference in the source object 110, a local path of a parameter in the source object 110 into a global path of the same parameter, or the like. For example, if the local path for the parameter in the source object 110 is "ITEM_NAME", the linker would resolve the local path of the parameter into the global path of the parameter, which might be "PUR-CHASE.ITEMS.ITEM_NAME". The linked structural representation 155 of the source object 110 would include the global path name. The local path of the parameter does not have to be changed and indeed might be preferred to the global path of the same parameter. The linker 140 allows this functionality and is not limited to the path the parameter in the source object 110. The linker 150 may modify the structural representation 135 of the source object 110 with additional information that may include local variables, interdependencies between dynamic link libraries, full names of tables in a database, versioning information, and comments by other software developers.

The linked structural representation 155 of the source object 110 can also be stored and used to re-create the source object 110 when desired; in a similar manner as the structural representation 135 of the source object 110 can be stored and used to re-create the source object 110, when desired. The linked structural representation 155 of the source object 110 is similar to the structural representation 135 of the source object 110 but contains additional information such as exact path names for variables, tables, or the like. It is noted that the linked structural representation 155 of the source object 110 contains the same one or more identifier tags 137 as in the structural representation 135 of the source object 110. If the one or more identifier tags 137 are not added by the parser (for example, it may be an implementation decision not to have the one or more identifier tags 137 added by the parser), the one or more identifier tags 137 can be added to the structural representation 155 of the source object 110 by the linker 150. The use of the one or more identifier tags 137 remains the same as discussed above.

The linked structural representation 155 of the source object 110 may be created in a markup language. In the examples that follow, the linked structural representation 155 of the source object 110 is created in extensible markup language (XML) but is not limited to XML and may be created in any language or form as to be received, processed, and/or saved to a computer readable storage medium.

The transformation engine 115 is shown with an optional formatter selector 160 that is configured to receive and determine an appropriate formatter from a plurality of formatters 162 to format the linked structural representation 155 of the source object 110. In at least one implementation, the formatter selector 160 is configured to support different types of source objects by performing a lookup according to a source object type.

Although the transformation engine 115 is shown as including a formatter selector 160, it is noted that the transformation engine 115 may be configured without the formatter selector 160. In such a configuration, the transformation engine 115 may be configured to format a single type of source object and would not require the formatter selector 160. Instead, the formatter 170 would receive the linked structural representation 155 of the source object 110 directly and format the linked structural representation 155 of the source object 110 because the corresponding formatter would be known.

The formatter 170 receives the linked structural representation 155 of the source object 110, receives one or more rule units 184, 186 from the rules module 180, formats the linked structural representation 155 of the source object 110, and creates a formatted linked structural representation 175 of the source object 110. A rules module 180 may contain one or more rule units 184, 186.

Formatting the linked structural representation 155 of the source object 110 may include modifying how the formatted linked structural representation 175 of the source object 110 is viewed and/or formatted according to a rule unit 184, 186 received from the rules module 180. The rule unit 184 can be configured according to a policy, the software developer's preferences, or the like. The policy may be any default or mandated rule unit or rule units determined by a standard or protocol. The rule unit 184 is customizable and provides the ability for the software developer to format and view a source object according to his preferences. The rule unit 184 can be saved for later use, utilized by a different transformation engine, or be associated with one or more software developers.

In at least one implementation, the rule unit 184 is configured according to five categories: keywords; delimiters; indentation; children indentation; and miscellaneous features. Below, each category is described and an example is provided illustrating the rule unit 184, code to which the rule unit 184 is applied and the formatted output. Although rule unit 184 is used in the specific example described, it is noted that the example is equally applicable to one or more other rule units. The present examples are suitable for application in a variety of different types of formatting and/or viewing of source object systems. These examples are not intended as a limitation of the types of rule units that can be implemented in formatting and/or viewing of source object systems.

The KEYWORDS category comprises two attributes that represent keywords reflecting the beginning and end of a statement in a source object: "prefix" and "suffix". These attribute are configurable to determine any group of letters or words that may be a prefix or suffix. Below is an example of the rule unit 184 using "prefix" and the corresponding formatted output.

Prefix Example

```
Rule:
    <update-statement prefix="UPDATE "/>
    <set-clause prefix="SET " delim=", " />
XML:
            <update-statement
                <from-clause-item >
                    <identifier >
                        <simple- identifier text="t1" />
                    </identifier>
                </from-clause-item>
                <set-clause >
                ...
                </set-clause>
            </update-statement>
Output:
    5       UPDATE t1
    6           SET
    7               id = 2 * (id + 1);
```

Below is an example of the rule unit 184 using "suffix" and the corresponding formatted output.

Suffix Example

```
Rule:
    <if-statement prefix="IF " suffix="END IF" never-same-line-suffix="Y"/>
XML:
            <if-statement >
                ...
                <then-statement >
                    <pl-sql-statement >
                        <update-statement>
                        ...
                        </update-statement>
                    </pl-sql-statement>
                </then-statement>
            </if-statement>
Output:
    10      IF i > 0 THEN
    11          UPDATE t1
    12              SET
    13                  id = (id + 1);
    14      END IF;
```

The DELIMITERS category comprises two attributes that represent delimiters for lists and are configurable to include if parentheses should be used if an element contains more than one child. Below is an example of the rule unit 184 using "delim" and the corresponding formatted output.

Delim Example

```
Rule:
    <expression-list inline = "Y" delim=", " />
XML:
            <select-statement >
                <basic-select-statement >
                    <select-expression-list >
                        <expression-list >
                            <expression-list-item >
                            ...
                            </expression-list-item>
                            ...
                            <expression-list-item >
                            ...
                            </expression-list-item>
                        </expression-list>
                    </select-expression-list>
```

-continued

```
                        ...
                    </basic-select-statement>
                </select-statement>
Output:
    16      SELECT 1, 2
    17      FROM dual;
```

Below is an example of the rule unit 184 using "need-parentheses" and the corresponding formatted output.

Need-Parentheses Example

```
Rule:
    <bitwise-expression new-line-if-children-more="9"  inline ="Y"
    prefix="(" suffix=")" need-parentheses="Y" />
XML:
            <bitwise-expression >
                <add-expression>
                    <power-expression >
                        <unary-expression >
                            <identifier>
                                <simple-identifier text="id" />
                            </identifier>
                        </unary-expression>
                    </power-expression>
                </add-expression>
                <add-level-operator text="+"/>
                <add-expression >
                    <power-expression >
                        <unary-expression >
                            <literal text="1" />
                        </unary-expression>
                    </power-expression>
                </add-expression>
            </bitwise-expression>
Output:
    7               id = 2 * (id + 1);
```

The INDENTATION category comprises three attributes that are configurable to modify indentation of a source object. Below is an example of the rule unit 184 using "inline" and the corresponding formatted output.

Inline Example

```
Rule:
    <literal inline = "Y" type-literal="Y"/>
XML:
            <unary-expression >
                <literal text="1" />
            </unary-expression>
Output:
    16      SELECT 1, 2
    17      FROM dual;
```

Below is an example of the rule unit 184 using "new-line-suffix" and the corresponding formatted output.

New-Line-Suffix Example

```
Rule:
    <statement-batch suffix="/" new-line-suffix="Y" inline = "Y"/>
XML:
    <oracle-root >
        <statement-batch >
            <sql-statement >
                <select-statement>
```

-continued

```
          ...
        </select-statement>
      </sql-statement>
    </statement-batch>
    <statement-batch >
      <sql-statement >
        <select-statement>
          ...
        </select-statement>
      </sql-statement>
    </statement-batch>
  </oracle-root >
Output:
  1     SELECT 1, 2
  2     FROM dual;
  3     /
  4     SELECT
  5        1,
  6        2,
  7        3,
  8        4,
  9        5,
 10        6
 11     FROM dual;
 12     /
```

Below is an example of the rule unit 184 using "same-line-suffix" and the corresponding formatted output.

Same-Line-Suffix Example

```
Rule:
<pl-sql-statement apply-to-child="Y" suffix=";" same-line-
suffix="Y"/>
XML:
            <pl-sql-statement>
              <update-statement>
              </update-statement>
            </pl-sql-statement>
            <pl-sql-statement>
              <select-statement >
              </select-statement
            </pl-sql-statement>
Output:
  5     UPDATE t1
  6       SET
  7         id = 2 * (id + 1);
 16     SELECT 1, 2
 17     FROM dual;
```

The CHILDREN INDENTATION category comprises three attributes that are configurable to modify indentation of a source object. Below is an example of the rule unit 184 using "new-line-children" and the corresponding formatted output.

New-Line-Children Example

```
Rule:
<argument-list prefix="(" suffix=")" new-line-children = "Y"
level-up="2" delim=", " />
XML:
            <procedure-header >
              <identifier >
              </identifier>
              <argument-list>
                <argument >
                </argument>
                <argument >
                </argument>
              </argument-list>
            </procedure-header>
```

-continued

```
Output:
  1     CREATE OR REPLACE PROCEDURE procedure_01
  2     (
  3       p1 number,
  4       p2 OUT varchar
  5     )
  6
  7     AS
```

Below is an example of the rule unit 184 using "new-line-if-children-more" and the corresponding formatted output.

New-Line-If-Children-More Example

```
Rule:
<select-expression-list inline="Y" new-line-if-children-more="4"
apply-to-child="Y"/>
XML:
            <select-statement >
              <basic-select-statement >
                <select-expression-list >
                  <expression-list >
                    <expression-list-item >
                      ...
                    </expression-list-item>
                    ...
                    <expression-list-item >
                      ...
                    </expression-list-item>
                  </expression-list>
                </select-expression-list>
                ...
              </basic-select-statement>
            </select-statement>
Output:
 16     SELECT 1, 2
 17     FROM dual;
 19     SELECT
 20        1,
 21        2,
 22        3,
 23        4,
 24        5,
 25        6
 26     FROM dual;
```

Below is an example of the rule unit 184 using "wide-if-more" and the corresponding formatted output.

Wide-If-More Example

```
Rule:
<block-body prefix="BEGIN " suffix="END" wide-if-more="1"
wide="1">
XML:
            <block-body >
              <select-statement >
              </select-statement>
              <select-statement >
              </select-statement>
            </block-body>
            <block-body>
              <select-statement >
              </select-statement>
            </block-body>
Output:
 32     BEGIN
 33
 34        SELECT 1, 2
 35        FROM dual;
 36
```

-continued
```
37      SELECT
38          1,
39          2,
40          3,
41          4,
42          5,
43          6
44      FROM dual;
45
46      END;
48      BEGIN
49          SELECT 1, 2
50          FROM dual;
51      END;
```

The MISCELLANEOUS FEATURES category comprises four attributes that are configurable to provide override formatting of a source object in particular instances, where desired. Below is an example of the rule unit 184 using "apply-to-child" and the corresponding formatted output.

Apply-To-Child Example

```
Rule:
<select-expression-list inline="Y" new-line-if-children-more="4"
apply-to-child="Y"/>
XML:
        <select-statement >
            <basic-select-statement >
                <select-expression-list >
                    <expression-list >
                        <expression-list-item >
                            ...
                        </expression-list-item>
                        ...
                        <expression-list-item >
                            ...
                        </expression-list-item>
                    </expression-list>
                </select-expression-list>
                ...
            </basic-select-statement>
        </select-statement>
Output:
16      SELECT 1, 2
17      FROM dual;
19      SELECT
20          1,
21          2,
22          3,
23          4,
24          5,
25          6
26      FROM dual;
27
```

Below is an example of the rule unit 184 using "level-up" and the corresponding formatted output.

Level-Up Example

```
Rule:
<from-clause prefix="FROM " delim=", " level-up="1" new-line-
if-children-more="2" same-line-suffix="Y"/>
XML:
        <select-statement>
            <basic-select-statement >
                <select-expression-list >
                </select-expression-list>
                <from-clause>
                </from-clause>
```

```
            </basic-select-statement>
        </select-statement>
Output:
16      SELECT 1, 2
17      FROM dual;
```

Below is an example of the rule unit 184 using "use-span" and the corresponding formatted output.

Use-Span Example

```
Rule:
<argument inline="Y" delim=" " use-span="Y"/>
XML:
        <procedure-header >
            <identifier >
            </identifier>
            <argument-list>
                <argument >
                </argument>
                <argument >
                </argument>
            </argument-list>
        </procedure-header>
Output:
1       CREATE OR REPLACE PROCEDURE procedure_01
2       (
3           p1 number,
4           p2 OUT varchar
5       )
```

Below is an example of the rule unit 184 using "never-same-line-suffix" and the corresponding formatted output.

Never-Same-Line-Suffix Example

```
Rules:
<if-statement prefix="IF " suffix="END IF" never-same-line-
suffix="Y"/>
<pl-sql-statement apply-to-child="Y" suffix=";" same-line-
suffix="Y"/>
XML:
        <pl-sql-statement>
            <if-statement >
                ...
                <then-statement >
                    <pl-sql-statement >
                        <update-statement>
                        ...
                        </update-statement>
                    </pl-sql-statement>
                </then-statement>
            </if-statement>
        </pl-sql-statement>
Output:
10      IF i > 0 THEN
11          UPDATE t1
12          SET
13              id = (id + 1);
14      END IF;
```

The rule unit 184 is not limited to formatting and/or viewing a source object. The rule unit 184 may include authentication information for accessing and modifying restricted source objects. The rule unit 184 is extensible and can be useful in configuring the formatting and/or viewing of a source object system in variety of ways that address security, synchronizing, access, storage, or the like.

Formatting the linked structural representation 155 of the source object 110 may include adding additional information to the linked structural representation 155 of the source object 110 so that it may be viewed by a viewer 195, irrespective of the rule unit 184. For example, the formatter 170 may add HTML code to the linked structural representation 155 of the source object 110 so that a web browser may view it, even though the rule unit 184 may not specify HTML code. The viewer 195 may include, but is not limited to, a web browser, a text editor, an integrated development environment viewer, or any application, method or mode for viewing the source object. Although the present examples are described and illustrated herein as being implemented in a web browser system, the system described is provided by way of example and not limitation.

The viewer 195 receives the formatted linked structural representation 175 of the source object 110 and displays the formatted linked structural representation 175 of the source object 110 on the display 198.

The formatter 170 also creates a mapping unit 176 which is shown included in the mapping module 158. The mapping unit 176 maps one or more line numbers corresponding to the display 198 of the formatted linked structural representation 175 of the source object 110 with the appropriate identifier tag 137. For example, a subroutine in the formatted linked structural representation 175 of the source object 110 may have a corresponding identifier tag "[ABC123]". The viewer 195 may present the subroutine on the display 198 corresponding to a set of line numbers "25 through 30". The mapping unit 176 creates a mapping between the identifier tag "[ABC123]" and the set of line numbers "25 through 30". It is noted that the set of line numbers may be dynamic and may be determined by the viewer 195. The mapping unit 176 maps the corresponding set of line numbers for each structural component 139 with the appropriate identifier tag 137 when the formatted linked structural representation 175 of the source object 110 is viewed by the viewer 195.

In the present implementation, the formatter 170 uses the identifier tag 137 from the linked structural representation 155 of the source object 110 to identify each structural component 139 of the linked structural representation 155 of the source object 110, and map the associated identifier tag 137 with the one or more line numbers corresponding to the associated structural component 139 of the formatted linked structural representation 175 of the source object 110 that is presented by the viewer 195 on a display 198.

In the present implementation, the sync module 197 tracks changes made to the formatted linked structural representation 175 of the source object 110 and communicates these changes to the mapping module 158. The mapping module 158 receives information from the syncing module 197 and refers to the mapping unit 176 to determine where the changes to the formatted linked structural representation 175 of the source object 110 correspond to the linked structural representation 155 of the source object 110. The mapping module 158 then makes the appropriate updates to the linked structural representation 155 of the source object 110.

In an alternate implementation, the formatted linked structural representation 175 of the source object 110 contains the identifier tag 137. The viewer 195 uses the identifier tag 137 of the formatted linked structural representation 175 of the source object 110 to track the changes to the formatted linked structural representation 175 of the source object 110 and directly updates the corresponding changes to the linked structural representation 155 of the source object 110 without the assistance of the mapping module 158.

Figure 2:
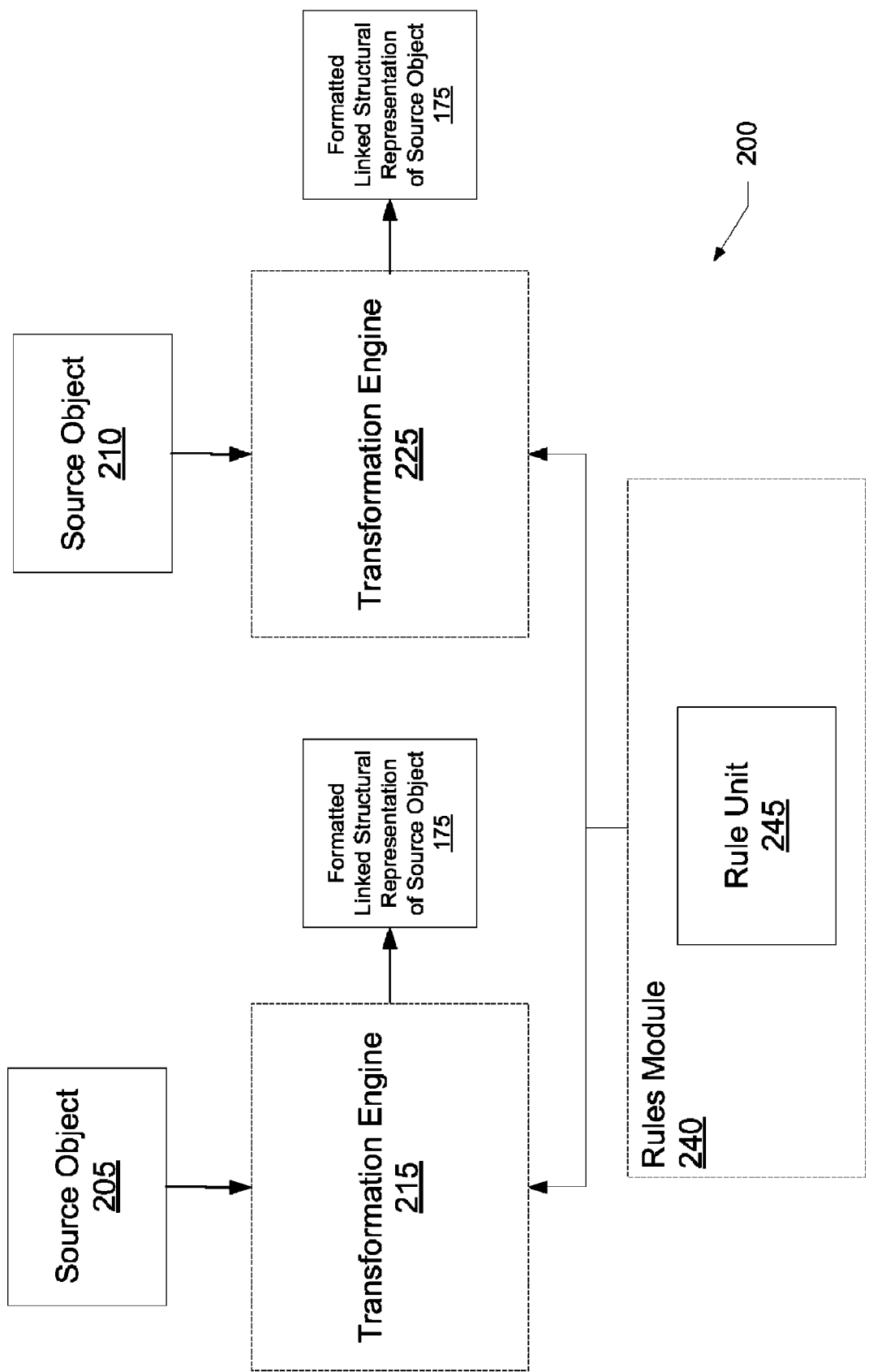
FIG. 2 is a diagram of an exemplary system for formatting a source object by applying rules to different source objects.

FIG. 2 is a diagram of an exemplary system 200 for formatting and viewing a source object by applying the same rules to different source objects that share similar syntax. A first transformation engine 215 receives a first source object 205. A second transformation engine 225 receives a second source object 210. The first transformation engine 215 and the second transformation engine 225 operate similarly to the transformation engine 115 as described above in FIG. 1. In the present implementation, the first source object 205 and the second source object 210 are of a different object type but share a similar syntax. For example, the first source object may be source code written in C++. The second source object may be source code written in Visual Basic. The syntax of an if-then statement in both programming languages is similar.

The first transformation engine 215 receives a rule unit 245 from a rules module 240 and processes the first source object accordingly, as described in FIG. 1. For example, the rule unit 245 determines how if-statements are formatted and/or viewed. In this particular example, if-statements of the first source object 205 are formatted according to the rule unit 245.

The second transformation engine 225 also receives the rule unit 245 from the rules module 240 and processes the second source object accordingly, as described in FIG. 1. In this particular example, if-statements of the second source object 210 are formatted according to the rule unit 245.

It is noted that the first transformation engine 215 and the second transformation engine 225 are able to process the first source object 205 and the second source object 210, respectively, because the first source object 205 and the second source object 210 are written according to similar syntax even though the source objects 205, 210 are of a different object type.

A similar syntax between a first source object and a second source object includes but is not limited by a programming syntax and the like. For example, as stated above, the programming language C++ and the programming language Visual Basic share similar syntax. The programming language Microsoft T/SQL and the programming language Oracle PL/SQL share similar programming syntax.

In an alternate implementation, the first source object 205 and the second source object 210 are of a different object type but do not share a similar syntax. The rule unit 184 may still be applied to the first source object 205 and the second source object 210, but the rule unit 184 can only determine formatting and/or viewing for a non-syntax related category. For example, the rule unit 184 may determine a font color and/or a font size, since such attributes do not depend on syntax. It is noted that the non-syntax related category may include but is not limited by font settings, security settings, access control, versioning, storage options, and the like.

Figure 3:
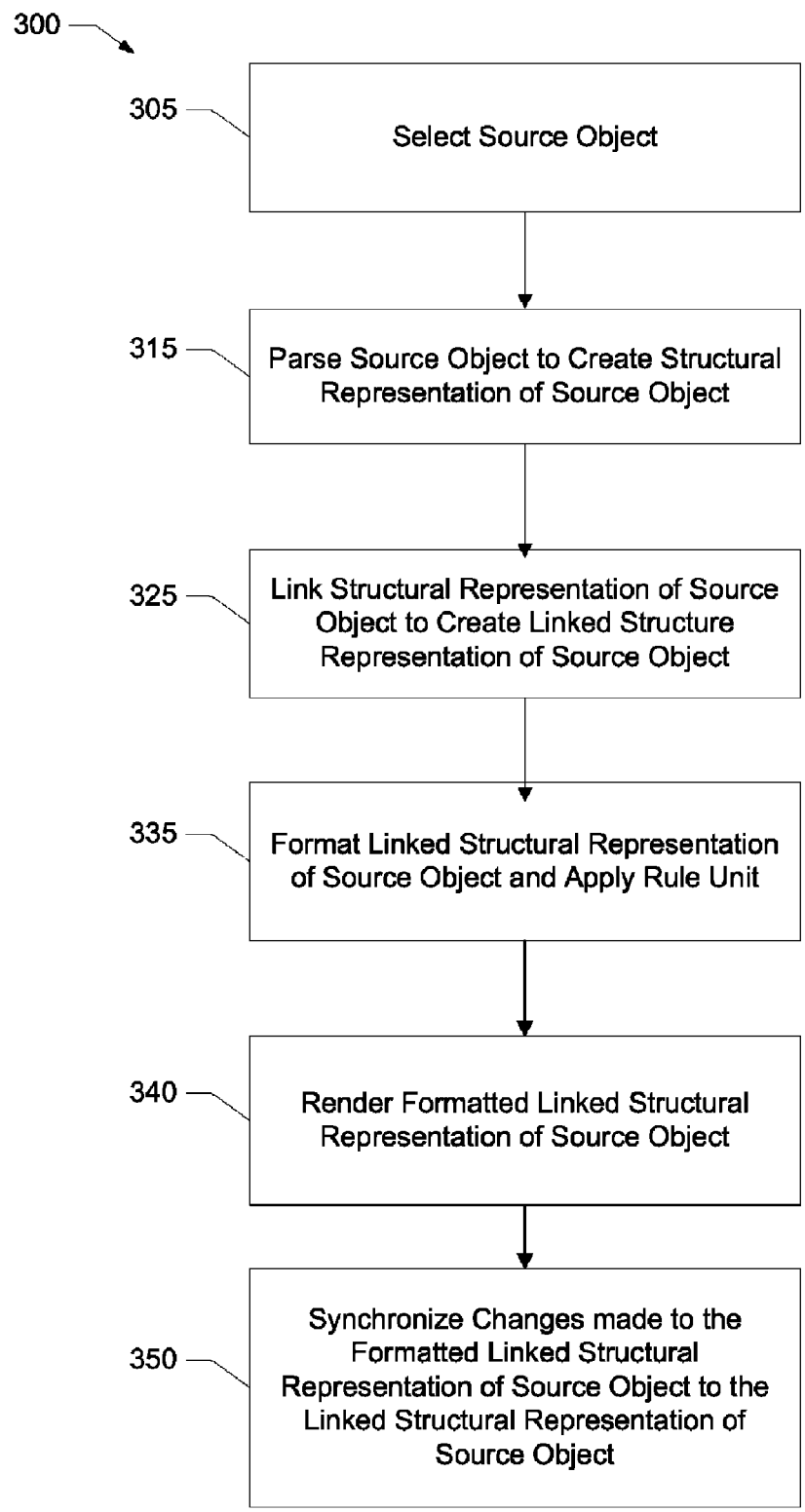
FIG. 3 is a flow chart depicting an exemplary implementation of formatting and viewing a source object.

FIG. 3 is a flow chart 300 depicting an exemplary implementation of formatting and viewing a source object. In the following description of FIG. 3, continuing reference is made to elements and reference numerals shown and described in one or more previous figures.

At block 305, a software developer selects a source object 110 for processing. The source object 110 is received by the parser 130 of the transformation engine 115 and parsed at block 315. When the source object 110 is parsed, a structural representation 135 of the source object 110 is created.

At block 325, the structural representation 135 of the source object 110 is linked. During linking, the structural representation 135 of the source object 110 is modified by replacing a local path name of a parameter in the source object 110 with a global path name of the same parameter as described above. This can be done for one or more variables, one or more table names, and the like. The resultant linked structural representation 155 of the source object 110 is stored on one or more computer-readable storage media.

The linked structural representation 155 of the source object 110 is formatted by applying one or more rule units 184, 186 at block 335. During the formatting step, the linked structural representation 155 of the source object 110 is formatted for a particular viewer. A software developer's preferences for formatting and/or viewing the source object 110 in the viewer 195 are also applied, if desired. The software developer's preferences are stored in the one or more rule units 184, 186. In the present implementation, the rule unit 184, 186 is not required to format and/or view the source object. For example, the original source object may be in a particular file format (for example, .txt file format). The software developer may want to view the source object in a web browser. The formatter may add the necessary HTML code to the linked structural representation of the source object for viewing by the web browser without the need of the rule unit.

At block 340, the formatted linked structural representation 175 of the source object 110 is rendered by the viewer 195. In the present implementation, the viewer 195 is a web browser.

At block 350, the sync 197 module detects changes made to the formatted linked structural representation 175 of the source object 110 that were made by the software developer and synchronizes the changes with the stored linked structural representation 155 of the source object 110. The sync 197 module detects changes and communicates the changes to the mapping module 158. The sync 197 module may be an ActiveX component that integrates with the web browser and is configured to communicate with the mapping module 158. The mapping 158 module receives the changes from the sync 197 module and updates the changes to the linked structural representation 155 of the source object 110 stored on the computer storage medium. The changes to the linked structural representation 155 of the source object 110 can be updated in real time or at a later time.

Figure 4:
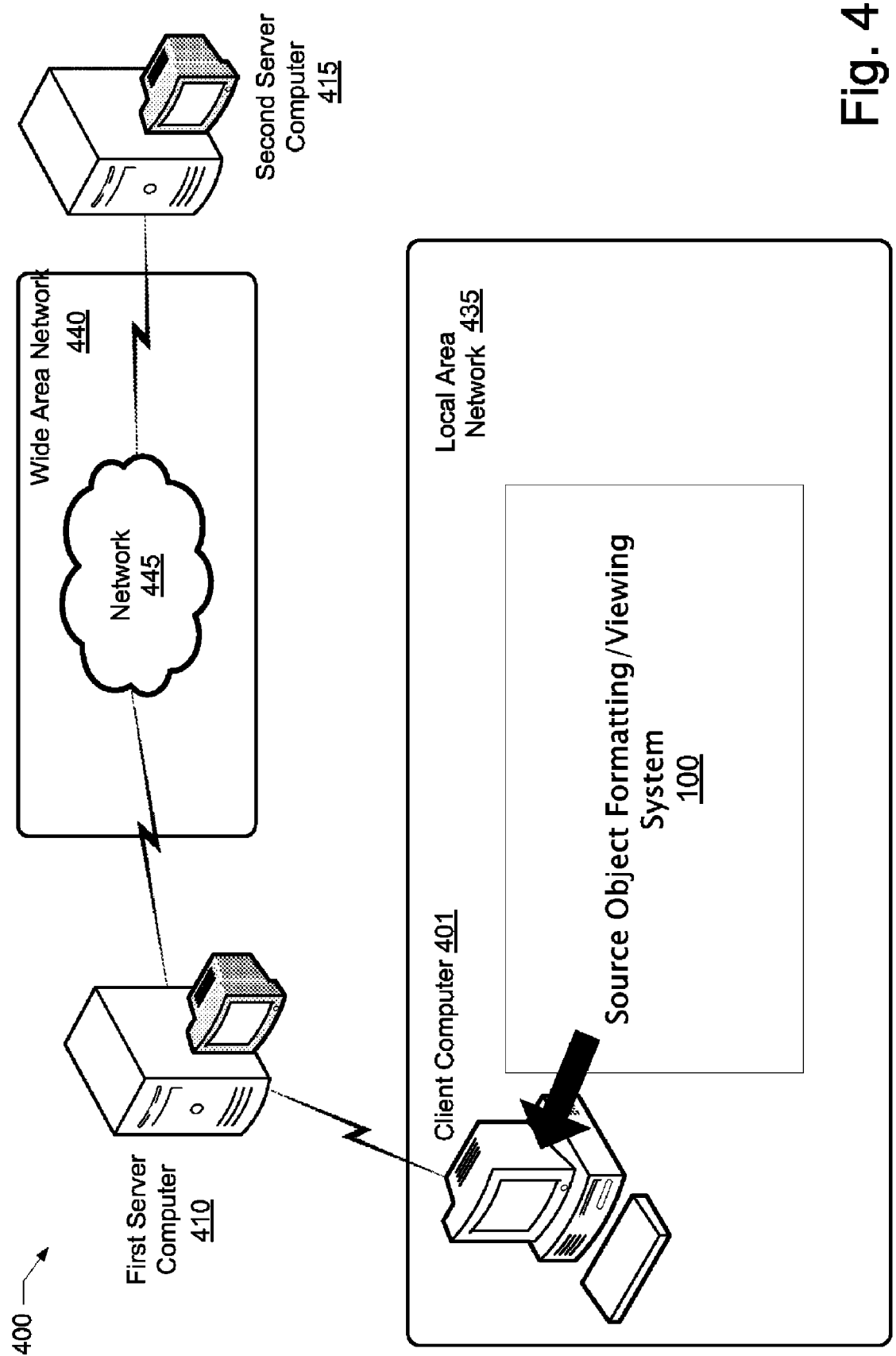
FIG. 4 is a network diagram that includes an exemplary system for formatting and viewing a source object running on a client computer.

FIG. 4 is a network diagram 400 that depicts the exemplary system 100 for formatting and viewing a source object (shown in FIG. 1) executing on a client computer 401.

The client computer 401 is a conventional PC but can be any computing device capable of hosting the system for formatting and viewing a source object. The client computer 401 is shown coupled via a local area network 435 to a first server computer 410. The first server computer 410 is shown coupled to a wide area network 440, which may include a network connection 445 to a second server computer 415.

The local area network 435 may include a plurality of computing devices (not shown) and/or peripheral devices (not shown). Computing devices connected to the local area network 435 may also include televisions, VCRs, cellular telephones, electronic appliances and the like.

Figure 5:
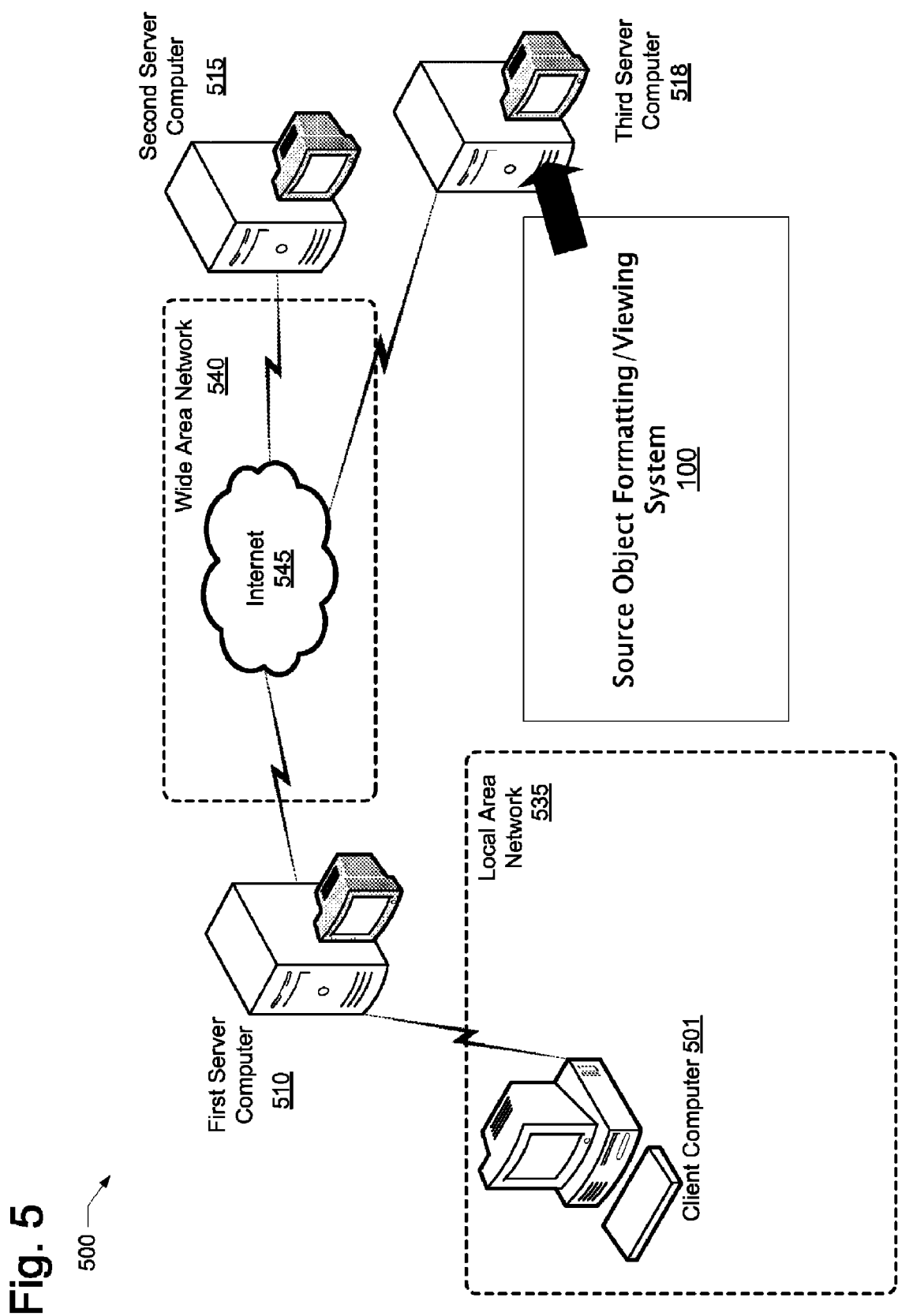
FIG. 5 is a network diagram that includes an exemplary system for formatting and viewing a source object running on a server computer.

FIG. 5 is a network diagram that includes an exemplary system for formatting and/or viewing a source object running on a server computer 500.

A client computer 501 may be coupled via a conventionally constructed local area network 535 to a conventional first server computer 510. The first server computer 510 may be coupled to a conventional wide area network 540, which may include a conventional Internet connection 545 to a conventional second server computer 515 and a third server 518 running the system for formatting and/or viewing the source object 100.

The local area network 535 may include a plurality of conventional computers (not shown) and conventional peripheral equipment (not shown) coupled together utilizing conventional topologies (token, star and the like) and conventional switching equipment. Computing devices 501, 510, 515, 518, and the like may include televisions, VCRs, cellular telephones, appliances and the like. These computing devices may be coupled to the Internet utilizing conventional techniques.

The local area network 535 may include a conventionally constructed ISP network in which a number, or plurality, of subscribers may utilize telephone dial up, ISDN, DSL, cellular telephone, cable modem, or similar connections to couple their computer to one or more server computers 515 that provide a connection to the World Wide Web 540 via the Internet 545.

The wide area network or World Wide Web 540 is conventionally constructed and may include the Internet 545 or equivalent structure for providing a wide area network. The wide area network may couple to any number of computers through any number of wide area and local area connections.

The third server 518 running the system for formatting and/or viewing the source object 100 may include a conventional operating system. The third server 318 can be a single server, a cluster of servers, and the like. When the software developer chooses to use the system for formatting and/or viewing the source object as a web service running on the third server 518, he may access the third server 518 via the client computer 501. The third server 518 facilitates storage and maintenance of the source object. The software developer may access the web service via a web browser running on the client computer 501. It is noted that access to the web service is not limited to the web browser and may be any application suitable for formatting and/or viewing the source object.

Figure 6:
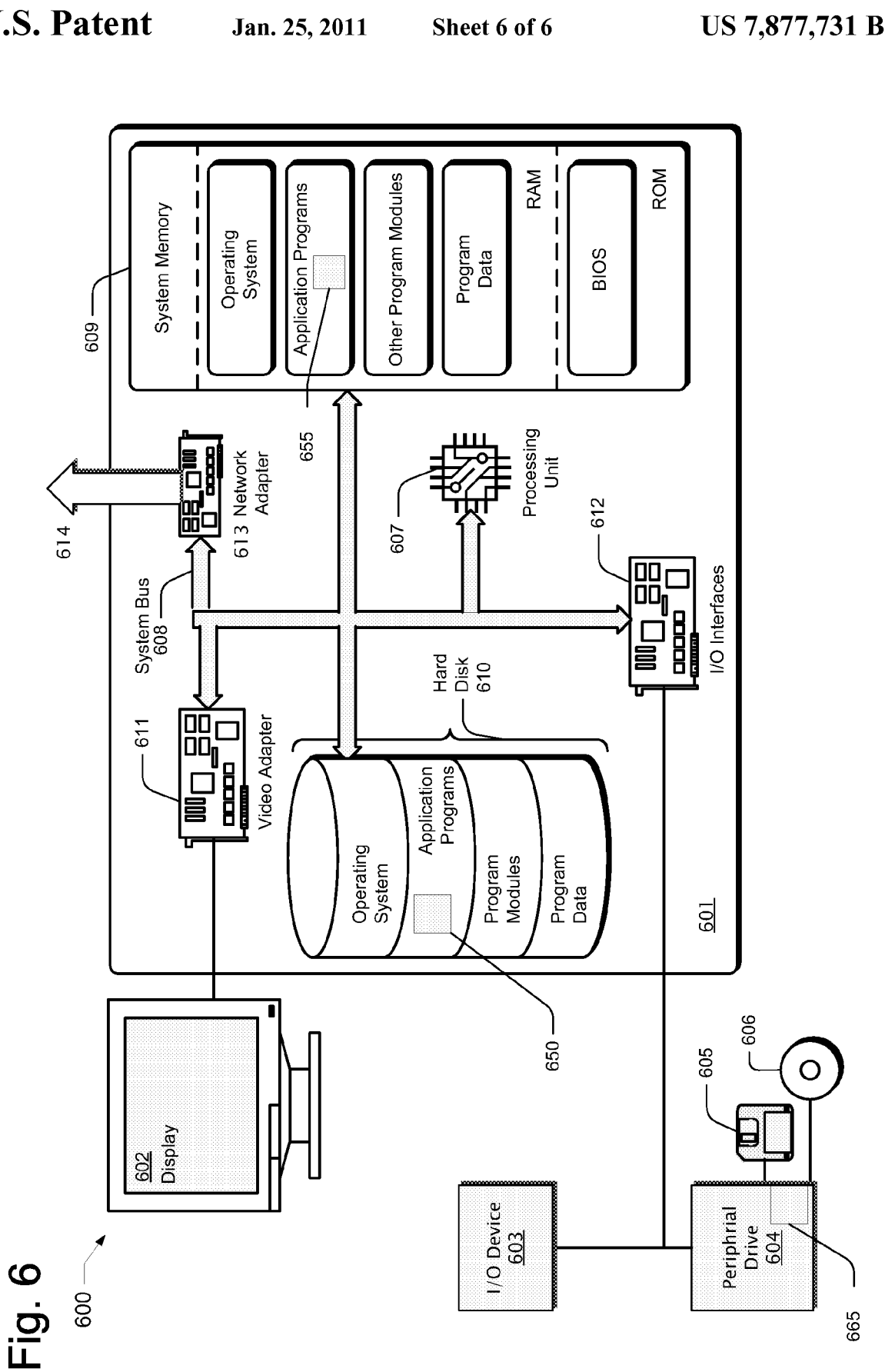
FIG. 6 depicts an exemplary computing environment within which the described techniques for formatting and viewing a source object may be implemented.

FIG. 6 is a diagram of an exemplary computer environment 600 in which the techniques described herein may be implemented. Exemplary computing environment 600 is only one example of a computing system and is not intended to limit the examples described in this application to this particular computing environment. The method for formatting and/or viewing the source object may be loaded onto a computing device 601 through the use of computer readable media 605, 606 or over a network 614. Once loaded onto the computing device 601 the method may reside as an application program 650 on an internal hard drive 610. When processing, the method may also exist as an application program 655 loaded into system memory 609.

The computing device 601 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

Components of computing device 601 can include one or more processors (including CPUs, GPUs, microprocessors and the like) 607, a system memory 609, a system bus 608 that couples the various system components, and the method described above. Processor 607 processes various computer executable instructions, including those to execute and run the method for formatting and/or viewing the source object 650 to control the operation of computing device 601 and to communicate with other electronic and computing devices (not shown). The system bus 608 represents any number of several types of bus structures, including a memory bus or memory controller, a peripheral bus, an accelerated graphics port, and a processor or local bus using any of a variety of bus architectures.

The system memory 609 may include computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 607. The method for formatting and/or viewing the source object 655 may be stored in RAM and may be accessible to and/or presently operated on by one or more of the processors 607.

Mass storage devices 604 may be coupled to the computing device 601 or incorporated into the computing device by coupling to the buss. Such mass storage devices 604 may include a magnetic disk drive which reads from and writes to a removable, non-volatile magnetic disk (e.g., a "floppy disk") 605, or an optical disk drive that reads from and/or writes to a removable, non-volatile optical disk such as a CD-ROM or the like 606. Computer readable media such as 605, 606 typically embody computer readable instructions, data structures, program modules and the like supplied on floppy disks, CDs, portable memory sticks and the like. The method for formatting and/or viewing the source object 665 may be provided to the CPU 601 by the peripheral device 604.

The methods previously described may be disposed on these computer readable media.

Any number of program modules can be stored on the hard disk 610, Mass storage devices 604, ROM and/or RAM 609, including by way of example, an operating system, one or more application programs, other program modules, and program data. The method for formatting and/or viewing the source object 650 may be stored on the hard disk 610 or made available through a peripheral drive 604. Each of such operating system, application programs, other program modules and program data (or some combination thereof) may include an embodiment of the systems and methods described herein.

A display device 602 can be connected to the system bus 608 via an interface, such as a video adapter 611. The display device 602 displays the method for formatting and viewing the source object to a user. A user can interface with computing device 602 via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computing device 601 can operate in a networked environment using connections to one or more remote computers through one or more local area networks (LANs), wide area networks (WANs) and the like. The computing device 601 is connected to a network 614 via a network adapter 613 or alternatively by a modem, DSL, ISDN interface or the like.

The storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). It is noted that by utilizing conventional techniques, all, or a portion of the software instructions may be carried out by a dedicated circuit, such as a DSP, programmable logic array, or the like.

What is claimed is:

1. A computer-implemented method for formatting and viewing representations of source objects, the method comprising:
    accessing a source object;
    parsing the source object and creating a structural representation of the source object;
    at a first computing system, accessing a first set of rules and using the first set of rules for formatting the structural representation of the source object into a first formatted structural representation of the source object, the first set of rules including preferences defined by a first user to be applied in displaying the first formatted structural representation of the source object, wherein a second computing system also accesses a second set of rules that are used to format the structural representation of the source object into a second formatted structural representation of the source object according to preferences defined by a second user;
    displaying the first formatted structural representation of the source object at the first computing system with a first viewer, wherein a second formatted structural representation of the source object is displayed simultaneously at a second computing system, the second formatted structural representation of the source object being distinguished from the first formatted structural representation of the source object;
    receiving and mapping changes that are received at the first computing system to the first formatted structural representation of the source object; and
    synchronizing changes to the structural representation of the source object according to the changes made to the first formatted structural representation of the source object, wherein the synchronized changes to the structural representation of the source object are updated in real-time and are displayed to the second user and are used to notify the second user at the second computing system which first one or more components of the structural representation of the source object are checked out for editing at the first computing system, and wherein second one or more components of the structural representation of the source object are checked out for editing by the second computing system simultaneously to the first one or more components being checked out for editing by the first computing system and wherein the method includes notifying the first user at the first computing system that the second one or more components are checked out for editing.

2. The method recited in claim 1, wherein the structural representation of the source object contains one or more identifier tags for each of a plurality of structural components.

3. The system of claim 1, wherein the method includes using a formatter that is configured to create a mapping unit that maps one or more line numbers corresponding to the rendered first formatted structural representation of the source object with an appropriate identifier tag.

4. The method of claim 1, wherein the method further includes discarding the source object from storage and replacing the source object with the structural representation of the source object.

5. The method of claim 4, wherein the method further includes re-creating the source object from the structural representation of the source object.

6. The method of claim 4, wherein the method further includes re-creating the source object from the synchronized version of the structural representation of the source object after changes have been made to the first formatted structural representation of the source object and after synchronizing the changes to the structural representation of the source object.

7. A computer storage device storing computer-executable instructions for implementing a method of formatting and viewing representations of source objects, wherein the method comprises:

accessing a source object;

parsing the source object and creating a structural representation of the source object;

at a first computing system, accessing a first set of rules and using the first set of rules for formatting the structural representation of the source object into a first formatted structural representation of the source object, the first set of rules including preferences defined by a first user to be applied in displaying the first formatted structural representation of the source object, wherein a second computing system also accesses a second set of rules that are used to format the structural representation of the source object into a second formatted structural representation of the source object according to preferences defined by a second user;

displaying the first formatted structural representation of the source object at the first computing system with a first viewer, wherein a second formatted structural representation of the source object is displayed simultaneously at a second computing system, the second formatted structural representation of the source object being distinguished from the first formatted structural representation of the source object;

receiving and mapping changes that are received at the first computing system to the first formatted structural representation of the source object; and synchronizing changes to the structural representation of the source object according to the changes made to the first formatted structural representation of the source object, wherein the synchronized changes to the structural representation of the source object are updated in real-time and are displayed to the second user and are used to notify the second user at the second computing system which first one or more components of the structural representation of the source object are checked out for editing at the first computing system, and wherein second one or more components of the structural representation of the source object are checked out for editing by the second computing system simultaneously to the first one or more components being checked out for editing by the first computing system and wherein the method includes notifying the first user at the first computing system that the second one or more components are checked out for editing.

8. The computing device recited in claim 7, further comprising one or more processors.

* * * * *